United States Patent
Meng et al.

(10) Patent No.: US 11,346,745 B2
(45) Date of Patent: May 31, 2022

(54) FATIGUE TEST ASSESSMENT METHOD

(71) Applicant: WEICHAI POWER CO., LTD., Weifang (CN)

(72) Inventors: Fandong Meng, Weifang (CN); Tao Wei, Weifang (CN); Shuai Teng, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/044,267

(22) PCT Filed: Sep. 3, 2018

(86) PCT No.: PCT/CN2018/103766
§ 371 (c)(1),
(2) Date: Sep. 30, 2020

(87) PCT Pub. No.: WO2019/242104
PCT Pub. Date: Dec. 26, 2019

(65) Prior Publication Data
US 2021/0055181 A1 Feb. 25, 2021

(30) Foreign Application Priority Data
Jun. 22, 2018 (CN) .......................... 201810653089.X

(51) Int. Cl.
*G01M 7/02* (2006.01)
*G01M 7/06* (2006.01)

(52) U.S. Cl.
CPC .............. *G01M 7/027* (2013.01); *G01M 7/06* (2013.01)

(58) Field of Classification Search
CPC ...... G01M 7/027; G01M 7/06; G01M 5/0075; G01M 5/0033; G01M 13/00
See application file for complete search history.

(56) References Cited

U.S. PATENT DOCUMENTS

| | | | | |
|---|---|---|---|---|
| 3,491,586 A | * | 1/1970 | Branger | ................... G01N 3/32 374/47 |
| 4,133,201 A | | 1/1979 | Klinger | |
| 2010/0275695 A1 | * | 11/2010 | Cotrell | .................... G01M 7/06 73/663 |

FOREIGN PATENT DOCUMENTS

| | | |
|---|---|---|
| CN | 103018032 A | 4/2013 |
| CN | 103018056 A | 4/2013 |

(Continued)

OTHER PUBLICATIONS

PCT International Search Report, PCT/CN2018/103766, Mar. 22, 2019, 6 Pages.

(Continued)

*Primary Examiner* — Suman K Nath
(74) *Attorney, Agent, or Firm* — Fenwick & West LLP

(57) ABSTRACT

A fatigue test assessment method for assessing a suspension point of a cylinder block by means of a fatigue test includes: fixing a suspension point of a cylinder block test piece by using a power assembly installation approach; applying a load to the suspension point of the cylinder block test piece in a preset direction; and determining whether the suspension point of the cylinder block fails. The method can ascertain, by means of assessment during a stage of parts testing, whether the structural strength of a suspension point of a cylinder block meets user requirements, so as to predict and prevent breakage of and faults in the suspension point of the cylinder block, thereby enhancing overall test validity.

18 Claims, 2 Drawing Sheets

(56) References Cited

FOREIGN PATENT DOCUMENTS

| | | | |
|---|---|---|---|
| CN | 103528808 A | | 1/2014 |
| CN | 103698117 A | | 4/2014 |
| CN | 203561509 U | | 4/2014 |
| CN | 105067238 A | | 11/2015 |
| CN | 205120365 U | | 3/2016 |
| CN | 205426499 U | * | 8/2016 |
| CN | 205426499 U | | 8/2016 |
| CN | 205879501 U | | 1/2017 |
| CN | 107290150 A | | 10/2017 |
| CN | 108088672 A | | 5/2018 |
| CN | 108444694 A | | 8/2018 |
| DE | 10-2012-022327 A1 | | 5/2014 |
| JP | 2007178151 A | | 7/2007 |
| SU | 473079 A1 | | 6/1975 |

OTHER PUBLICATIONS

Jinzhi, F., et al., "Study on Fatigue Life of Mounting Bolts Based on Road Load Spectrum," Agricultural Equipment & Vehicle Engineering, Apr. 2017, vol. 55, No. 4, pp. 47-52.

Zhou, Z., "Property Calculation and Experimental Study Design Method for Mount Bracket of a Powertrain," Shengyang Aerospace University Thesis for Master's Degree, Mar. 2016, 72 pgs.

European Patent Office, Extended European Search Report and Opinion, EP Patent Application No. 18923698.7, dated Feb. 21, 2022, ten pages.

\* cited by examiner

FATIGUE TEST ASSESSMENT METHOD

This application is a national phase of International Application No. PCT/CN2018/103766, titled "FATIGUE TEST ASSESSMENT METHOD", filed on Sep. 3, 2018, which claims the priority to Chinese Patent Application No. 201810653089.X, titled "FATIGUE TEST ASSESSMENT METHOD", filed with the China National Intellectual Property Administration on Jun. 22, 2018, both of which applications are incorporated herein in their entireties by this reference.

FIELD

The present application relates to the technical field of mechanical design and manufacturing, and in particular to a method for a fatigue test assessment for a fatigue test assessment for carrying out a fatigue test assessment on a suspension point of a cylinder block.

BACKGROUND

A cylinder block, that is, a main body of an engine, connects each cylinder with a crankcase. The cylinder block is a support framework for installing pistons, crankshafts, other parts and accessories.

An engine suspension system is mainly used to reduce a vibration transmitted by power assembly to a vehicle body, so as to improve riding comfort and ensure that the engine assembly is always at a correct position, control a displacement of engine assembly and avoid dynamic interference between the engine assembly and the peripheral parts, which may cause damage to the engine assembly or the parts.

During use, it is found that a point on the cylinder block corresponding to a mounting position of the suspension system (that is, "a suspension point of a cylinder block", referred to as "suspension point") is susceptible to damage. However, in the conventional technology, there is no mature and applicable system and method for carrying out a fatigue assessment on the suspension point of the cylinder block. And it is impossible to assess whether the structural strength of the suspension point of the cylinder block meets the use requirements during a stage of the parts testing.

Therefore, those skilled in the art have a strong desire to carry out the fatigue assessment on the suspension point of the cylinder block to assess whether the structural strength of the suspension point of the cylinder block meets the use requirements in the stage of the parts testing.

SUMMARY

An object of the present application is to provide a method for a fatigue test assessment, which can carry out a fatigue assessment on a suspension point of a cylinder block to assess whether the structural strength of the suspension point of the cylinder block meets the use requirements in a stage of the parts testing.

In order to achieve the above object, the following technical solutions are provided according to the present application.

A method for a fatigue test assessment is used for carrying out a fatigue test assessment on the suspension point of the cylinder block, and the method includes: in step a, fixing the suspension point of a cylinder block sample according to an installation mode of power assembly; in step b, applying a load on the suspension point in a preset direction; and in step c, determining whether the suspension point damages or not.

Preferably, the above method further includes: in step d, if the suspension point damages, determining a damage position, a bolt elongation and torque, and recording a final test data; and in step e, if the suspension point passes the loading assessment, terminating the test, measuring the bolt elongation and recording the final test data.

Preferably, in the above method, a fluorescence flaw detection method is used to determine the damage position, and the damage position includes a crack part.

Preferably, in step b of the above method, the preset direction includes: an X direction, where the X direction is a front-back horizontal direction that the suspension point of the cylinder block is impacted by a front-back movement of an engine under a working condition of simulating an acceleration and braking of a whole vehicle; and/or, a Z direction, where the Z direction is a vertical direction that the suspension point of the cylinder block is impacted by an up and down bumping of the engine up and down under the working condition of simulating a bumping of the whole vehicle; and/or, a Y direction, where the Y direction is a left-right horizontal direction that a lateral force is applied on the suspension point of the cylinder block by the engine due to inertia under the wording condition of simulating a turning of the whole vehicle.

Preferably, in step b of the above method, loads in different preset directions are sequentially applied.

Preferably, in step b of the above method, the applied load includes a dynamic load that is cyclically loaded and a static load that is singly loaded in static.

Preferably, in the above method, a cycle cardinality of the dynamic load is 0.25 million times. And/or, a calibration load of the static load is calculated in advance based on a suspension mode of the power assembly of the whole vehicle.

Preferably, in the above method, whether the suspension point damages is determined by monitoring an anomalous change of displacement amplitude of the suspension point.

Preferably, in the above method, a passing method is taken as an assessment criterion, and the passing method is that a preset number of cylinder block samples is taken as a group, and if all the cylinder block samples in the group have completed a process of the loading application in step b without damage, then the cylinder block samples are determined to meet the strength target.

Preferably, in the above method, the method for the fatigue test assessment is carried out on a four-pillar test bench driven by hydraulic pressure.

It can be seen from the above technical solution that the method for the fatigue test assessment according to the present application can carry out the fatigue test assessment on the suspension point of the cylinder block during the stage of the parts testing, and accurately assess whether the structural strength of the suspension point of the cylinder block meets the requirements, so as to predict and avoid the occurrence of the fracture of the suspension point of the cylinder block in advance, and control the validity of the whole vehicle test.

BRIEF DESCRIPTION OF THE DRAWINGS

To illustrate technical schemes according to the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by those skilled in the art based on those drawings without creative effort.

Figure 1:
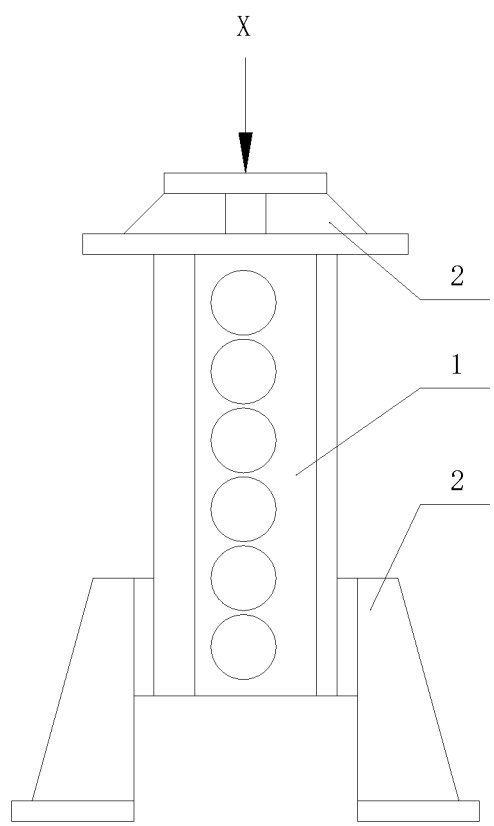
FIG. 1 is a schematic structural view when a suspension point of a cylinder block is loaded in an X direction in a method for a fatigue test assessment according to an embodiment of the present application.

Reference numerals: 1 cylinder block sample, 2 support.

DETAILED DESCRIPTION OF THE EMBODIMENTS

A method for a fatigue test assessment is disclosed according to the present application, which can carry out a fatigue assessment on a suspension point of a cylinder block to assess whether the structural strength of the suspension point of the cylinder block meets the use requirements in a stage of the parts testing.

Technical solutions of embodiments of the present application are clearly and completely described hereinafter in conjunction with the drawings of the embodiments of the present application. Apparently, the embodiments described in the following are only some embodiments of the present application, rather than all embodiments. Any other embodiments obtained by those skilled in the art based on the embodiments in the present application without any creative work fall in the scope of protection of the present application.

Figure 2:
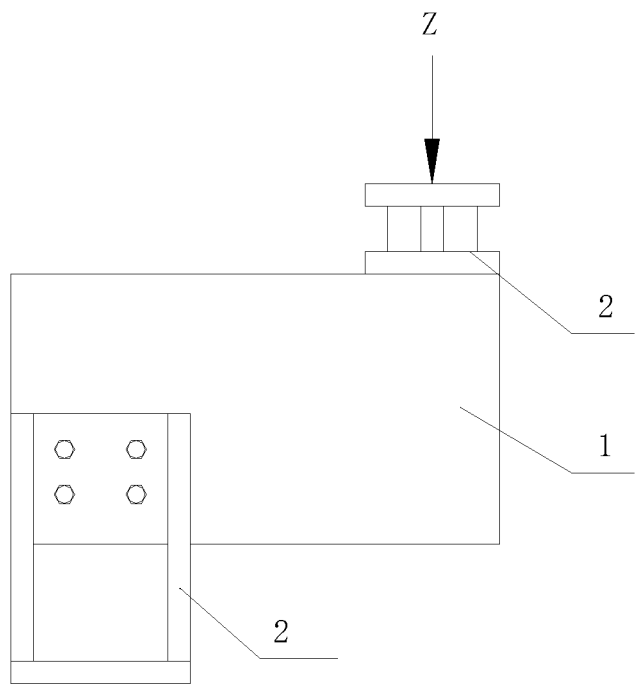
FIG. 2 is a schematic structural view when the suspension point of the cylinder block is loaded in a Z direction in a method for a fatigue test assessment according to the embodiment of the present application.
Figure 3:
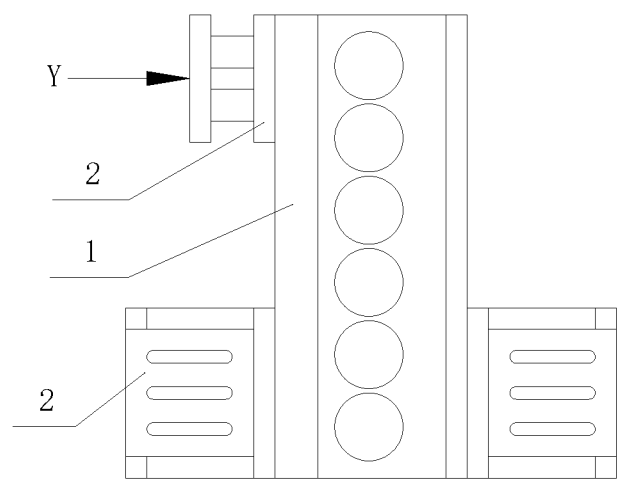
FIG. 3 is a schematic structural view when the suspension point of the cylinder block is loaded in a Y direction in a method for a fatigue test assessment according to the embodiment of the present application.

Referring to FIGS. 1 to 3, FIG. 1 is a schematic structural view when a suspension point of a cylinder block is loaded in an X direction in a method for a fatigue test assessment according to an embodiment of the present application; FIG. 2 is a schematic structural view when the suspension point of the cylinder block is loaded in a Z direction in a method for a fatigue test assessment according to the embodiment of the present application; and FIG. 3 is a schematic structural view when the suspension point of the cylinder block is loaded in a Y direction in a method for a fatigue test assessment according to the embodiment of the present application.

The method for the fatigue test assessment according to the embodiment of the present application is used for carrying out a fatigue test assessment on the suspension point (a front suspension point) of the cylinder block, which includes: in step a, the suspension point of a cylinder block sample 1 is fixed according to an installation mode of a power assembly; in step b, a load is applied on the suspension point of the cylinder block sample 1 in a preset direction, and a process of the loading application is controlled by force parameters; and in step c, whether the suspension point damages or not is observed and determined, and specifically, whether the suspension point damages is determined by monitoring an anomalous change of displacement amplitude of the suspension point.

It can be seen that the method for the fatigue test assessment for the suspension point of the cylinder block is provided according to the embodiment of the present application, which can carry out the fatigue test assessment on the suspension point of the cylinder block during the stage of the parts testing, and accurately assess whether the structural strength of the suspension point of the cylinder block meets the requirements, so as to predict and avoid the occurrence of the fracture of the suspension point of the cylinder block in advance, and control the validity of the whole vehicle test.

Further, the method for the fatigue test assessment further includes: in step d, if the suspension point damages, a damage position, a bolt elongation and torque are determined, and a final test data is recorded. Specifically, a fluorescent flaw detection method is preferably used to determine the damage position (such as a crack part); and in step e, if the suspension point passes the loading assessment, the test is terminated, the bolt elongation is measured and the final test data is recorded.

Specifically, in step b, a loading test is carried out on the suspension point of the cylinder block in three directions, that is, the "preset direction" includes an X direction, a Y direction and a Z direction, which are perpendicular to each other (taking the cylinder block sample 1 as a reference). Where: the X direction is a front-back horizontal direction that the suspension point of the cylinder block is impacted by a front-back movement of an engine under a working condition of simulating an acceleration and braking of a whole vehicle; the Z direction is a vertical direction that the suspension point of the cylinder block is impacted by an up and down bumping of the engine up and down under the working condition of simulating the jolt of the whole vehicle; and the Y direction is a left-right horizontal direction that a lateral force is applied on the suspension point of the cylinder block by the engine due to inertia under the wording condition of simulating a turning of the whole vehicle.

In an embodiment, the loading mode used in step b is a uniaxial loading, that is, the loads in different preset directions are sequentially applied. And the loading mode is shown in FIGS. 1, 2 and 3.

In an embodiment, the cylinder block sample 1 is fixed by a tooling support 2, and a rear end of the cylinder block sample 1 is connected with a hydraulic actuator to apply the load. When a test load is applied on the suspension point of the cylinder block in different directions, the tooling support 2 may adopt the same structure, or a pair of tooling supports 2 may be used for different fixed modes of the cylinder block sample 1. It should be noted that each time the cylinder block sample 1 is fixed, the suspension point thereof is fixed according to the installation mode of the power assembly.

In an embodiment, in step b, the load applied to the suspension point of the cylinder block includes a dynamic load that is cyclically loaded and a static load that is singly loaded in static. A cycle cardinality of the dynamic load is 0.25 million times. And a calibration load of the static load is calculated in advance based on a suspension mode of the power assembly of the whole vehicle.

Specifically, when the dynamic load is applied to the suspension point of the cylinder block in a certain preset direction, and when the cycle number of the test is greater than the cycle cardinality of 0.25 million times, then it is considered that the test load level is lower than a load limit of the suspension point of the cylinder block in the preset direction, and the dynamic load test in the preset direction is terminated.

The test load refers to pulsating load amplitude used in an i-th independent test in a group of tests that the total number of subsamples is n.

The cycle cardinality refers to a limit of the cycle number under a fixed load when the fatigue strength is measured. If the limit is exceeded, the test is terminated and it is considered that the sample may never produce fatigue damage under this load.

The fatigue strength refers to resistance of the sample to the fatigue damage, which is expressed by a load level corresponding to a certain fatigue life.

The fatigue life refers to a cycle number that the sample has passed before the fatigue damage under a specified load level.

Specifically, when the load is applied, oil pressure is transmitted to the suspension point of the cylinder block through a hydraulic cylinder, a simulated connecting rod piston group and a simulated shaft, so as to realize the loading on the suspension point of the cylinder block. After being amplified by the hydraulic amplifier, the pulsating hydraulic load acts on the piston directly.

Specifically, the method for a fatigue test assessment takes a passing method as an assessment criterion, and the passing method is that a preset number (for example, three) of cylinder block samples 1 is taken as a group, and if all the cylinder block samples 1 in the group have completed the process of the loading application in step b without damage, then the cylinder block samples are determined to meet the strength target.

For example, in a preferred embodiment, three cylinder block samples are taken as a group. If the three cylinder block samples have completed the maximum cycle number specified in each direction in the dynamic load assessment process, and the maximum load specified in each direction in the static load assessment process without damage, then the three cylinder block samples are determined to meet the strength target.

Specifically, the method for the fatigue test assessment is carried out on a four-pillar test bench (also known as a four-pillar vibration bench) driven by hydraulic pressure.

As can be seen, the method for the fatigue test assessment according to embodiment of the present application adopts a newly designed loading fatigue test system and method in three directions, which can carry out the fatigue test assessment on the suspension point (the front suspension point) of the cylinder block during the stage of the parts testing, and accurately assess whether the structural strength of the suspension point of the cylinder block meets the requirements, so as to predict and avoid the occurrence of the fracture of the suspension point of the cylinder block in advance, and control the validity of the whole vehicle test.

It should be noted here that the present application does not specifically limit a loading sequence, a loading system and a specific structure of the tooling support 2, and those skilled in the art can carry out a specific implementation according to actual needs.

Finally, it should be noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical elements in the process, method, article, or device that includes said elements.

The above embodiments are described in a progressive manner. Each of the embodiments is mainly focused on describing its differences from other embodiments, and references may be made among these embodiments with respect to the same or similar parts.

The above illustration of the disclosed embodiments can enable those skilled in the art to practice or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A method for a fatigue test assessment for carrying out a fatigue test assessment on a suspension point of a cylinder block, comprising:
   in step a, fixing the suspension point of a cylinder block sample according to an installation mode of power assembly;
   in step b, applying a load on the suspension point in a preset direction; and
   in step c, the suspension point passes the fatigue test assessment if the suspension point is not damaged, and the suspension point fails to pass the fatigue test assessment if the suspension point is damaged;
   in step d, if the suspension point is damaged, determining a damage position, a bolt elongation and torque, and recording a final test data; and
   in step e, if the suspension point passes the fatigue test assessment, terminating the fatigue test assessment, measuring the bolt elongation and recording the final test data.

2. The method according to claim 1, wherein, a fluorescence flaw detection method is used to determine the damage position and the damage position comprises a crack part.

3. The method according to claim 2, wherein, the applied load in step b comprises a dynamic load that is cyclically loaded and a static load that is singly loaded in static.

4. The method according to claim 2, wherein, a passing method is taken as an assessment criterion, and the passing method is that:
   a preset number of cylinder block samples is taken as a group, and if all the cylinder block samples in the group have completed a process of the loading application in step b without damage, then the cylinder block samples are determined to meet a strength target.

5. The method according to claim 1, wherein, in step b, the preset direction comprises:
   an X direction, wherein the X direction is a front-back horizontal direction that the suspension point of the cylinder block is impacted by a front-back movement of an engine under a working condition of simulating an acceleration and braking of a whole vehicle;
   and/or, a Z direction, wherein the Z direction is a vertical direction that the suspension point of the cylinder block is impacted by an up and down bumping of the engine under the working condition of simulating a bumping of the whole vehicle;
   and/or, a Y direction, wherein the Y direction is a left-right horizontal direction that a lateral force is applied on the suspension point of the cylinder block by the engine due to inertia under the working condition of simulating a turning of the whole vehicle.

6. The method according to claim 5, wherein, in step b, loads in different preset directions are sequentially applied.

7. The method according to claim 6, wherein, the applied load in step b comprises a dynamic load that is cyclically loaded and a static load that is singly loaded in static.

8. The method according to claim 6, wherein, a passing method is taken as an assessment criterion, and the passing method is that:
   a preset number of cylinder block samples is taken as a group, and if all the cylinder block samples in the group have completed a process of the loading application in step b without damage, then the cylinder block samples are determined to meet a strength target.

9. The method according to claim 5, wherein, the applied load in step b comprises a dynamic load that is cyclically loaded and a static load that is singly loaded in static.

10. The method according to claim 5, wherein, a passing method is taken as an assessment criterion, and the passing method is that:
    a preset number of cylinder block samples is taken as a group, and if all the cylinder block samples in the group have completed a process of the loading application in step b without damage, then the cylinder block samples are determined to meet a strength target.

11. The method according to claim 1, wherein, the applied load in step b comprises a dynamic load that is cyclically loaded and a static load that is singly loaded in static.

12. The method according to claim 11, wherein, a cycle cardinality of the dynamic load is 0.25 million times;
    and/or, a calibration load of the static load is calculated in advance based on a suspension mode of the power assembly of the whole vehicle.

13. The method according to claim 11, wherein, in step c, whether the suspension point damages is determined by monitoring an anomalous change of displacement amplitude of the suspension point.

14. The method according to claim 1, wherein, a passing method is taken as an assessment criterion, and the passing method is that:
    a preset number of cylinder block samples is taken as a group, and if all the cylinder block samples in the group have completed a process of the loading application in step b without damage, then the cylinder block samples are determined to meet a strength target.

15. The method according to claim 1, wherein, the method for the fatigue test assessment is carried out on a four-pillar test bench driven by hydraulic pressure.

16. The method according to claim 1, wherein, the applied load in step b comprises a dynamic load that is cyclically loaded and a static load that is singly loaded in static.

17. The method according to claim 1, wherein, a passing method is taken as an assessment criterion, and the passing method is that:
    a preset number of cylinder block samples is taken as a group, and if all the cylinder block samples in the group have completed a process of the loading application in step b without damage, then the cylinder block samples are determined to meet a strength target.

18. The method according to claim 1, wherein, the method for the fatigue test assessment is carried out on a four-pillar test bench driven by hydraulic pressure.

* * * * *